US012657224B2

(12) United States Patent
Jain et al.

(10) Patent No.: US 12,657,224 B2
(45) Date of Patent: *Jun. 16, 2026

(54) CROSSDOMAIN CONFIDENCE SCORING ALGORITHM USING VECTORS AND SIMILARITY SCORES

(71) Applicant: intuit Inc, Mountain View, CA (US)

(72) Inventors: Siddharth Jain, Mountain View, CA (US); Vijay Thomas, Mountain View, CA (US); Venkat Vedam, Mountain View, CA (US); Pratik Lala, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 18/525,779

(22) Filed: Nov. 30, 2023

(65) Prior Publication Data

US 2025/0181619 A1 Jun. 5, 2025

(51) Int. Cl.
*G06F 16/334* (2025.01)
*G06F 16/383* (2019.01)

(52) U.S. Cl.
CPC ........ *G06F 16/3344* (2019.01); *G06F 16/383* (2019.01)

(58) Field of Classification Search
None
See application file for complete search history.

(56) References Cited

U.S. PATENT DOCUMENTS

2008/0313142 A1* 12/2008 Wang .................... G06F 16/353
2010/0299336 A1* 11/2010 Bergstraesser ...... G06F 16/9538
                                                                705/14.54
2020/0250239 A1* 8/2020 Huang .................... G06F 16/93

OTHER PUBLICATIONS

Thulke et al., "Efficient Retrieval Augmented Generation from Unstructured Knowledge for Task-Oriented Dialog" (Year: 2021).*
Ahn et al., "Retrieval-Augmented Response Generation for Knowledge-Grounded Conversation in the Wild" (Year: 2022).*
Izacard et al., "Atlas: Few-shot Learning with Retrieval Augmented Language Models" (Year: 2022).*
Siriwardhana et al., "Improving the Domain Adaptation of Retrieval Augmented Generation (RAG) Models for Open Domain Question Answering" (Year: 2022).*

* cited by examiner

*Primary Examiner* — Paras D Shah
*Assistant Examiner* — Jacob B Vogt
(74) *Attorney, Agent, or Firm* — Lathrop GPM LLP

(57) ABSTRACT

Aspects of the invention provide a method, computer system, and computer program product for retrieval augmented generation. In one aspect, the method includes receiving a query. The method further includes classifying the query to a first domain within a multitude of domains. The method additionally includes retrieving an index of domain-specific vector embeddings corresponding to the domains. The method further includes prompting a large language model (LLM) with the query and the domain-specific vector embeddings. The method also includes receiving a query response from the LLM as grounded with the most relevant index results. The method further includes forwarding the query response.

11 Claims, 6 Drawing Sheets

Recommendation Engine
128

Sigmoid Score
210

Weighted Confidence Score
220

Global Confidence Score
230

Compare Domains
240

Computing
System
600

608
Output Device(s)

604
Non-Persistent
Storage

602
Computer
Processor(s)

606
Persistent Storage

612
Communication
Interface

610
Input Device(s)

620
Network

622
Node X o o o

624
Node Y

626
Client Device

CROSSDOMAIN CONFIDENCE SCORING ALGORITHM USING VECTORS AND SIMILARITY SCORES

BACKGROUND

Large Language Models (LLM) have revolutionized the field of natural language processing (NLP) with their ability to understand, generate, and translate human language with unprecedented accuracy. These models, powered by deep learning algorithms and trained on vast datasets, may perform a wide range of language tasks, from answering questions to composing text. The utility of LLM has been widely recognized in various applications, including search engines, virtual assistants, and automated customer service.

Despite their capabilities, current LLM face significant challenges that limit their practicality. One of the primary issues is their one-size-fits-all approach to query understanding and response generation. This may lead to suboptimal results when dealing with domain-specific queries, as the models may not have sufficient specialized knowledge or the ability to discern the context accurately. Moreover, LLM often struggle with integrating added information post-training and may produce responses that lack relevance or are outdated. The computational cost of querying LLM is another concern, especially when high accuracy is required, as it often necessitates extensive processing power and time.

Retrieval Augmentation Generation (RAG) is a method that enhances the capabilities of LLM by incorporating a retrieval-based approach to augment the generation process. This method involves classifying a query into a specific domain and retrieving domain-specific vector embeddings that are then used to prompt the LLM. By grounding the LLM's responses in the most relevant index results, RAG aims to provide more accurate, context-aware, and up-to-date answers. This approach not only improves the quality of the responses but also optimizes the computational efficiency by focusing the LLM's resources on the most pertinent information.

SUMMARY

In general, in one aspect, one or more embodiments related to a method. The method includes receiving a query. the method further includes classifying the query to a first domain within a plurality of domains. the method additionally includes retrieving an index of domain-specific vector embeddings corresponding to the domains. the method further includes prompting a large language model with the query and the domain-specific vector embeddings. the method also includes receiving a query response from the large language model as grounded with the most relevant index results. the method further includes forwarding the query response.

In general, in one aspect, one or more embodiments related to a system comprising a computer processor, a memory, and instructions stored in the memory. The instructions are executable by the computer processor to cause the computer processor to perform operations. The operations include receiving a query. the operations further include classifying the query to a first domain within a plurality of domains. the operations additionally include retrieving an index of domain-specific vector embeddings corresponding to the domains. the operations further include prompting a large language model with the query and the domain-specific vector embeddings. the operations also include receiving a query response from the large language model as grounded with the most relevant index results. the operations further include forwarding the query response.

In general, in one aspect, one or more embodiments related to a computer program product comprising non-transitory computer-readable program code that, when executed by a computer processor of a computing system, cause the computing system to perform operations. The operations include receiving a query. the operations further include classifying the query to a first domain within a plurality of domains. the operations additionally include retrieving an index of domain-specific vector embeddings corresponding to the domains. the operations further include prompting a large language model with the query and the domain-specific vector embeddings. the operations also include receiving a query response from the large language model as grounded with the most relevant index results. the operations further include forwarding the query response.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to systems designed to enhance user interactions with a large language model (LLM) by providing context-aware and relevant answers. These systems described herein are geared toward improving the relevance and grounding of LLM results within specific knowledge domains through the utilization of domain-specific embeddings, a novel ranking algorithm, and tunable hyperparameters, all of which collectively contribute to delivering more accurate and tailored responses to user queries.

Specifically, the system entails the classification of user queries into distinct knowledge domains. Using a novel set of classification algorithms, the system is capable of narrowing the domain context within an embedding set. This approach enables us to determine the priority of different domain indices, based on several factors, including biasing, user history, context, conversation history, and the popularity and relevance of knowledge domains. Selecting an appropriate domain index and grounding the LLM to the relevant domain ensures that the LLM offers the most suitable answers based on the users determined the context.

The embodiments described herein combine multiple embeddings, user context, domain-specific rankings, and intricate algorithms to create a more comprehensive and personalized response to user queries. Personalized recommendations are made across multiple domains by employing a domain-specific biasing approach. similarity distance scores are normalized, and a weighted confidence score is calculated for each knowledge domain, considering the current domain context, domain popularity, and conversational history. A tunable global confidence score serves as a threshold for comparing and suggesting knowledge domains, enhancing the grounding of LLM results.

Figure 1:
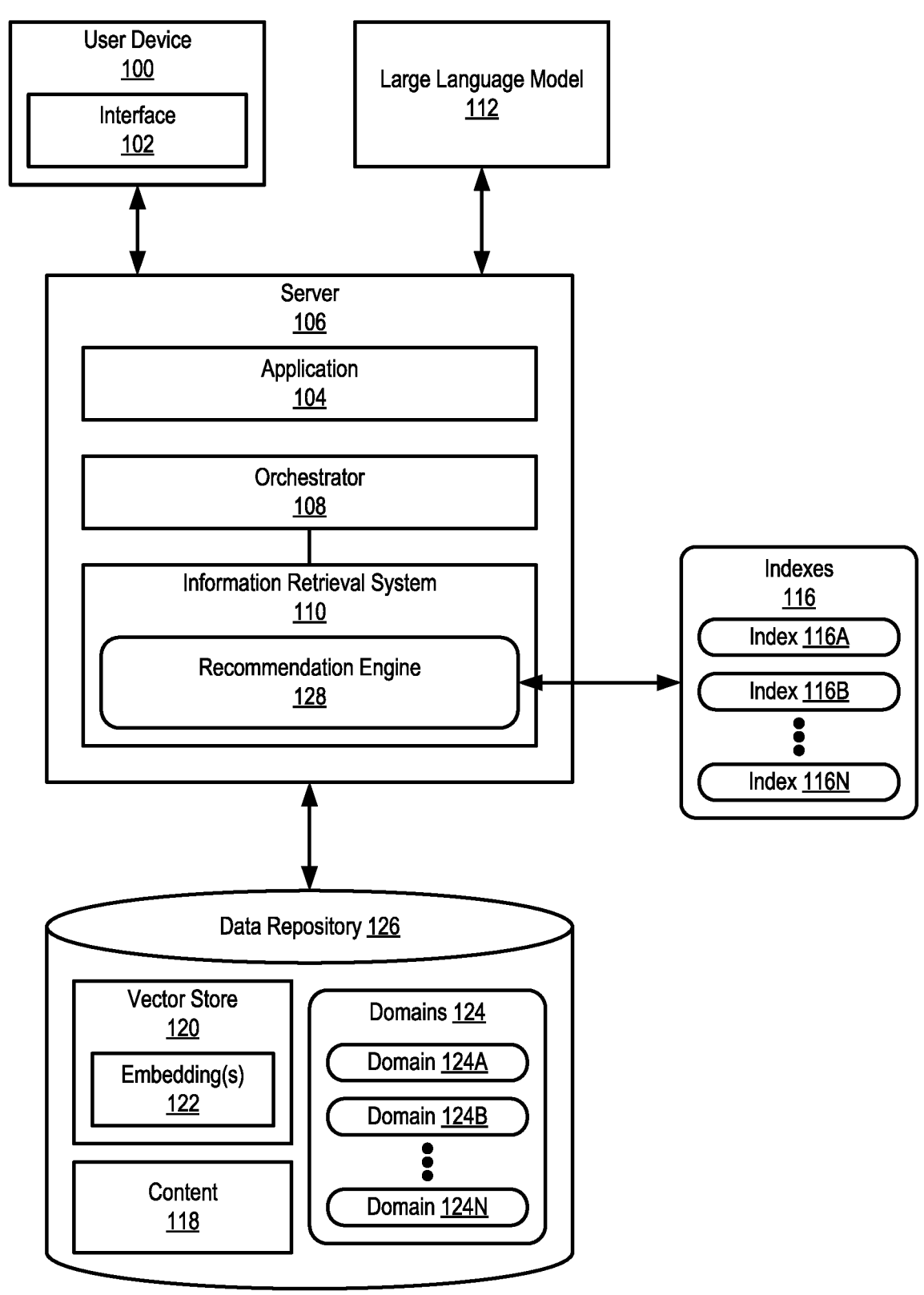
FIG. 1 shows an example data processing environment ("environment") (100) in accordance with the disclosed embodiments.

Turning to FIG. 1, an example data processing environment ("environment") is illustrated in accordance with the disclosed embodiments. This system illustrated in figure one may include a user device (100), a server (106), and a data repository (124).

The system shown in FIG. 1 includes a user device (100). A "user device" refers to a physical or virtual entity utilized by an individual for accessing and interacting with computer-based systems, applications, or services. The user device (100) encompasses various hardware or software components that enable users to perform tasks, access information, or communicate with other entities. The user device (100) may take different forms, including, but not limited to, desktop computers, laptops, smartphones, tablets, wearable devices, and virtual machines.

The user device (100) includes an interface (102) that enables a user to interact with the application (104). As used herein, an "interface" refers to a defined boundary or connection point between different components and/or systems. The interface facilitates the exchange of information, commands, or data between software applications and/or system components in a standardized and consistent manner. Interface (102) may be manifested in various forms, including a graphical user interface (GUI) and an application programming interface (API).

The system shown in FIG. 1 includes one or more server(s) (106). The server(s) (102) is one or more computers, possibly communicating in a distributed computing environment. The server(s) (102) may include multiple physical and virtual computing systems that form part of a cloud computing environment. Thus, the server(s) (102) includes one or more processors. The processor may be hardware, or a virtual machine programmed to execute one or more controllers and/or software applications. For example, the processors of the server(s) (102) may be the computer processor(s) (602) of FIG. 6A.

The server(s) (106) may host applications, such as websites, and may serve structured documents (hypertext markup language (HTML) pages, extensible markup language (XML) pages, JavaScript object notation (JSON) files and messages, etc.) to interact with user device (100) connected via a network. Execution of the instructions, programs, and applications of the server(s) (102) is distributed to multiple physical and virtual computing systems in the cloud computing environment.

The application (104) may be a web application that provides the user experience, providing the presentation, context, and user interaction. Questions or prompts from a user start here. Inputs pass through the integration layer, going first to information retrieval to get the search results, but also go to the LLM to set the context and intent.

The orchestrator (108) is the integration code that coordinates the handoffs between information retrieval and the LLM. In one example, the orchestrator (108) may use LangChain that integrates with Azure Cognitive Search to coordinate the workflow between the various components. The orchestrator includes functionality to prompt the large language model based on the original user query, and domain specific embeddings retrieved by the information retrieval system.

For example, In a RAG pattern, the orchestrator (108) coordinates queries and responses between the information retrieval system (110) and the LLM (112). A user's question or query is forwarded to both the search engine and to the LLM (112) as a prompt. The search results come back from the search engine and are redirected to an LLM (112). The response returned to the user is generative AI, either a summation or answer from the LLM (112).

The information retrieval system (110) provides the searchable indexes (116), query logic, and the payload (query response). The various search indexes, including index (116A, 116B . . . 116N) may contain vectors or non-vector content. The indexes (116) are created in advance based on a user defined schema and loaded with content (118) that is sourced from files, databases, or storage.

The information retrieval system (110) may support vector search capabilities for indexing, storing, and retrieving vector embeddings from indexes (116). The vector search retrieval technique uses these vector representations to find and rank relevant results. By measuring the distance or similarity between the query vector embeddings and the indexed document vectors, vector search is capable of finding results that are contextually related to the query, even if they do not contain the exact same keywords.

The information retrieval system includes a recommendation engine (128). the recommendation engine is software for classifying user queries into specific knowledge domains (120). To further refine the domain classification, the recommendation engine calculates weighted confidence scores to determine how much each domain is relevant in the current conversation context. as described below with respect to FIG. 2, these scores may consider multiple factors such as a current context (the topic the user is currently discussing), a conversation history (previous queries and interactions), and a popularity of the different domains.

Each of indexes (116) may include one or more fields that duplicate or represent the source content (118). For example, an index field might be simple transference (a title or description in a source document becomes a title or description in a search index), or a field might contain the output of an external process, such as vectorization or skill processing that generates a representation or text description of an image.

Searchable content is stored in a search index that is hosted on your search service in the cloud. In order to provide faster query service and responses, indexes (116) store indexed content, and not whole content files like entire PDFs or images. Internally, the data structures include inverted indexes of tokenized text, vector stores (120) for embeddings (122), and unaltered text for cases where verbatim matching is required (for example, in filters, fuzzy search, regular expression queries).

Vector stores (120) are databases that store embeddings for different phrases or words. By using a vector store, developers may quickly access pre-computed embeddings, which may save time and improve the accuracy of the model's responses. Vector stores are especially useful for applications that require fast responses, such as chatbots or voice assistants.

Embeddings (122) are numerical representations of concepts (data) converted to number sequences Embeddings are mathematical portrayals of words or phrases, enabling the comparison of distinct blocks of text. Consequently, this empowers the model to grasp the underlying meanings of words and yield responses that are notably more precise.

For example, OpenAI's embeddings model is a vector of floating-point numbers that represents the "meaning" of text.

The distance between two vectors serves as a gauge of their degree of relatedness. Smaller distances indicate a higher degree of relatedness, whereas larger distances signify lower relatedness.

The embeddings may be categorized into one or more different domains (124), such as domain (124A, 124 B . . . 124N). These knowledge domains are distinct areas of knowledge or datasets that the system has access to. For example, these domains could include databases like GitHub, Wikipedia (or Wiki), StackOverflow, and more.

Each of domains (120) may correspond to a different one of indexes (116). For example, index (116A) store indexed content for domain (124A). Similarly, index (116B) store indexed content for domain (124B), and index (116N) may store indexed content for domain (124N).

The content (118), vector store (120), and domains (122) may be stored in a data repository (126). In one or more embodiments of the invention, the data repository (126) is any type of storage unit and/or device (e.g., a file system, database, data structure, or any other storage mechanism) for storing data. Further, the data repository (126) may include multiple different, potentially heterogeneous, storage units and/or devices.

The system shown in FIG. 1 includes LLM (112). A LLM (112) is a sophisticated computational system characterized by an extensive capacity to comprehend and generate natural language text. The LLM (112) encompasses a complex network of interconnected artificial intelligence algorithms and statistical models that enable the LLM (112) to process, understand, and produce human-like language patterns and structures. The "large" nature of refers to the vast size of the model, typically involving billions of parameters, which allows the LLM (112) to capture and learn from a vast amount of linguistic and textual data. The LLM's capabilities extend beyond simple rule-based or pattern matching approaches, exhibiting the ability to generate coherent and contextually relevant textual responses, predictions, or summaries. The extensive size and linguistic knowledge of the LLM (112) enables a high degree of language understanding and generation proficiency in various natural language processing applications, including but not limited to text generation, language translation, sentiment analysis, and question-answering systems.

For example, a LLM (112) based on a transformer architecture, such as OpenAI's GPT models, Nvidia's Megatron-LM, or Microsoft's Turing-NLG, utilizes massive data sets and scaling of the transformer architecture. For example, the GPT-3 training data set includes results from a massive web crawl. This volume of data allows the expansion of GPT-3 to 175 billion parameters using 96 attention layers, each with a 96×128 dimension head, enabling few or zero-shot training paradigms. By prompting the model with a few response paradigms, the GPT-3 model understands the context, produces results, and may structure responses automatically, without retraining parameters.

Figure 2:
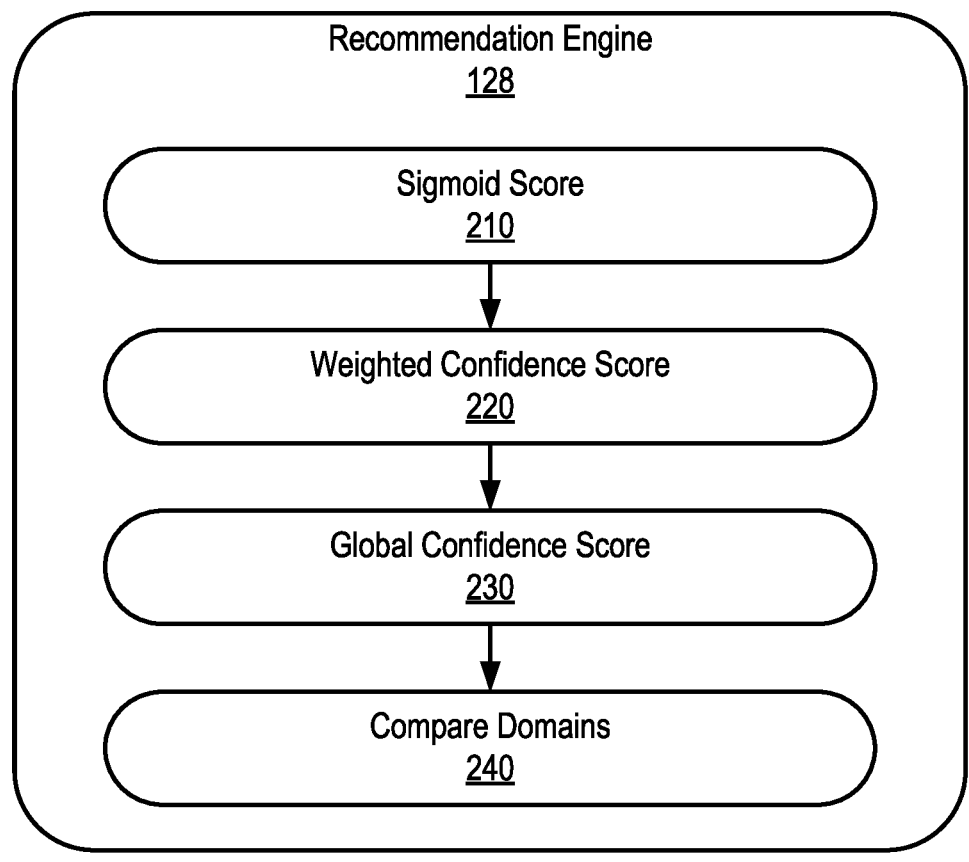
FIG. 2 shows a recommendation engine according to illustrative embodiments.

Turning to FIG. 2, a recommendation engine is shown according to illustrative embodiments. The recommendation engine of FIG. 2 shows the major processing steps for classifying a query to a particular domain.

Queries processed by a query engine typically return both results and confidence scores associated with different knowledge domains. These knowledge domains are distinct areas of knowledge or datasets that the system has access to. For example, these domains could include databases like GitHub, Wikipedia (or Wiki), StackOverflow, etc. The confidence scores indicate how confident the system is that a particular domain is relevant to the user's query.

Calculate Sigmoid Score (210)—

To normalize confidence score results for each domain, a sigmoid function is used to normalize the numerical boundaries of confidence scores between 0 and 1. The aim is to ensure that these confidence scores are comparable across different knowledge domains. The process allows for consistent interpretation and comparison of confidence scores, regardless of their source. Therefore, a sigmoid score is calculated for each confidence score result per domain.

For each confidence score i from all the domains j, the sigmoid score may be calculated using the original confidence scores x, as follows:

$$S(x) = \frac{1}{1 + \exp^{-x}} \qquad \text{Equation 1}$$

wherein:
x=confidence score

Calculate Weighted Confidence Score (220)—

The system calculates confidence scores to enhance the domain classification process. The weighted confidence score are calculated for each knowledge domain to provide a deeper understanding domain relevance. The confidence score consider multiple factors, including the current context of the conversation, the history of interactions (or conversation history), and the popularity of each domain.

The confidence scores are related to sigmoid scores. The weights may be influenced by multiple factors like popularity, history, etc., per query. A biasing constant gamma is added which may augment (i.e., boost or downgrade) a particular confidence score. Instead of choosing a global constant gamma, this system may use a query-specific hypertuned variable for greater control.

For example, the confidence score may be determined as:

$$\text{weight}_i^j = \gamma \frac{\text{sigmoid}_i^j}{\sum_{i=1}^{k} \text{sigmoid}_i^j} \qquad \text{Equation 2}$$

wherein:
weight=confidence score
j=domain index
i=current index
γ=constant bias
sigmoid=sigmoid function (normalized score) (Equation 1)
k=number of top results Because the system compares the confidence score across multiple domains, weighted confidence scores are determined for top k results across each domain. The weighted confidence scores may be determined by taking the sum of the product of sigmoid scores and the weight for top k results in each domain and adding a domain specific biasing constant eta.

For example, the weighted confidence per domain may be determined as:

$$\text{weighted confidence}^j = \sum_{i=1}^{k} \left( \text{sigmoid}_i^j \times \text{weight}_i^j \right) + \eta_j \qquad \text{Equation 3}$$

wherein:
j=domain index k=number of top results
i=current index
sigmoid=sigmoid function (normalized score) (Equation 1)
weight=confidence score weight (Equation 2)
$\eta_j$=domain specific biasing constant The domain specific biasing constant $\eta_j$ allows the system to fine-tune the influence of the factors mentioned above (popularity, history, etc.) on the weighted confidence scores, this parameter is used to tailor the bias for a specific domain. For instance, if the system identifies that a particular query is frequently asked and answered in the context of a specific domain, a stronger bias will be applied towards that domain, even if other factors suggest otherwise.

For example, the domain specific biasing constant $\eta_j$ may be determined as follows:

$$\eta_j = \omega_c \times C_j + \omega_h \times H_j + \omega_p \times P_j \qquad \text{Equation 4}$$

wherein:
$\omega_c$=weight for current context
$C_j$=current context relevance to domain j
$\omega_h$=weight for conversation history
$H_j$=conversation history relevance to domain j
$\omega_p$=weight for popularity
$P_j$=popularity of domain j The domain specific biasing constant $\eta_j$ includes a set of parameters, such as domain-specific bias, context bias, and popularity bias. The system controls these parameters to set how much each factor impacts biasing to a particular domain. The parameters allow the system to dynamically adapt to different contexts and user behaviors. As shown in equation 4, the domain specific biasing constant $\eta j$ considers multiple factors, such as current context, conversation history, and domain popularity.

The current context $Cj$ is a current context that the user is in and pertains to the specific topic that the user is currently discussing. The current context $Cj$ adds a contextual boost to the relevance of a particular domain, given the present conversation topic.

The current context $Cj$ may be a normalized score (i.e., $0<Cj<1$). A weight $\omega_c$ for current context is also added which accounts for relative importance of the current context in determining eta. The A weight $\omega_c$ balances the influences of current context and tunability.

The current context $Cj$ bias allows for the adjustment of bias based on the user's current conversation context. If the user is discussing a specific topic, the system may apply additional bias to domains related to that topic. For example, if the user is discussing software development, the system would assign a higher weight to domains related to coding, repositories, and development tools. This ensures that the system provides contextually relevant responses.

Conversation History $Hj$ represents the conversation history related to domain j and may encompasses all the previous queries and interactions within the ongoing session. This historical context helps determine which domains the user has been interacting with most frequently. In other words, the conversation history $Hj$, biases domain relevance based on prior conversations.

The conversation history $Hj$ may be a normalized score (i.e., $0<Hj<1$), which may be influenced by recency of interactions in the domain j. A weight $\omega_h$ for conversation history is also added to derive relative importance of conversation history.

Popularity $Pj$ is the popularity of a particular domain j, which may be based on the total engagement with each domain. The Popularity bias may enable the system to adapt domain bias based on the popularity of domains. If a domain is highly popular and widely used by the user base, that domain may receive more significant biasing to ensure that the system delivers responses aligned with user preferences.

For example, if the system has five distinct domains, the system assesses how often users have engaged with each domain. Domains that receive more user engagement are considered more popular and receive a higher weight in the domain classification process.

Popularity Bias—

The popularity $Pj$ may be a normalized score (i.e., $0<Pj<1$). A weight $Op$ is added to control the relative importance of domain popularity when determining the domain's weighted confidence score.

Calculate the Global Confidence Score (230):

The global confidence score is an indication of the overall relevance for query results across all domains. The global confidence score reflects the system's understanding of the query's context, history, and the relative popularity for all of the various domains. In other words, the global confidence score provides a global weight cutoff to classify results as relevant or non-relevant.

Given a constant beta which is tunable, the global confidence may be defined as the sum of mean and beta times the standard deviation of weighted scores. For example, the global confidence score may be determined as follows.

$$\text{global confidence} = \mu + \beta + \sigma \qquad \text{Equation 5}$$

wherein:
$\mu$=mean of weighted confidence
$\beta$=tunable hyperparameter
$\sigma$=standard deviation The mean $\mu$ may be determined as follows:

$$\mu = \frac{\sum_{j=1}^{k} \text{weighted confidence}^j}{d} \qquad \text{Equation 6}$$

wherein:
weighted confidence=weighted confidence per domain (Equation 3)
d=number of domains The standard deviation $\sigma$ may be determined as follows:

$$\sigma = \sqrt{\frac{\sum \left( \text{weighted confidence}^j - \mu \right)^2}{d}} \qquad \text{Equation 7}$$

wherein:
weighted confidence=weighted confidence per domain (Equation 3)
$\mu$=mean (Equation 6)
d=number of domains The hypermeter Beta $\beta$ defines the number of standard deviation steps required for a cutoff. A high value of beta may allow the system to return query results that are more diverse. Conversely, a smaller Beta $\beta$ may be used to penalize results outside of domain j, and yielding query results that are more constricted.

Compare Domains (240)—

Once the global confidence score has been determined, the system proceeds to classify the query into a specific knowledge domain. This classification serves as a guide for the LLM, indicating which knowledge domain to focus on when generating responses. Classification enables the LLM to tailor answers to the context of the user's query, thereby enhancing the user experience and providing more relevant information.

The system compares the weighted confidence score for the context domain with the global confidence score. If the weighted confidence score for a domain is greater than the global confidence score, the system identifies that domain as relevant to the user's query, and results are restricted to that domain. If the context domain's weighted confidence score is not greater than the global confidence score, results from other domains are presented.

In other words, the result may be presented as follows:

$$\text{Recommendation} = \begin{cases} \text{Results from Context Domain} \\ \text{if } \textit{weiughted} \text{ confidence} > \text{global confidence} \\ \text{Results from other domain otherwise} \end{cases}$$

Equation 8

The recommendation may then be provided back to the orchestrator (108) of FIG. 1 when generating a prompt to the LLM. Prompts to the LLM are restricted according to the indexed embeddings of the recommended domain.

While FIG. 1 and FIG. 2 show a configuration of components, other configurations may be used without departing from the scope of the invention. For example, various components may be combined to create a single component. As another example, the functionality performed by a single component may be performed by two or more components.

Figure 3:
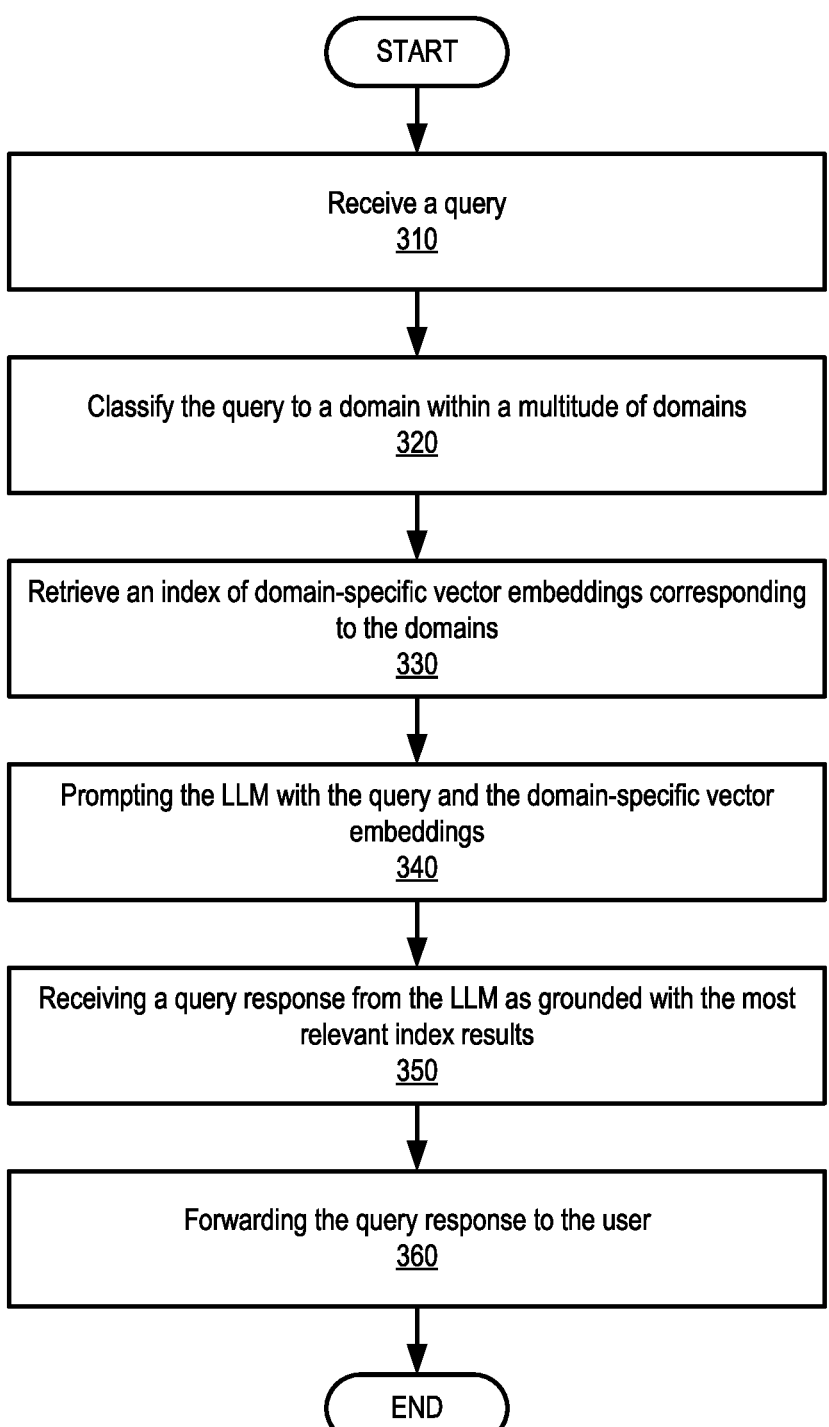
FIG. 3 shows a flow chart for retrieval augmented generation according to illustrative embodiments.

Turning to FIG. 3, a flow chart for retrieval augmented generation is shown according to illustrative embodiments. A process shown in FIG. 3 may be performed using one or more components of figure one, such as information retrieval system (110).

While the various steps in this flowchart are presented and described sequentially, at least some of the steps may be executed in different orders, may be combined or omitted, and at least some of the steps may be executed in parallel. Furthermore, the steps may be performed actively or passively.

At step 310, a query is received. The query may be received from an interface, such as user interface (102) of FIG. 1.

For example, the system may receive user queries through a user interface (UI), which could be part of a web application, mobile app, desktop software, or even a command-line tool. In web applications, the UI may send the user's query to the backend server using HTTP/HTTPS protocols via RESTful APIs, which are stateless and require the full user query in each request. For more dynamic, real-time interactions, WebSockets may be employed to establish a persistent, full-duplex communication channel, allowing the server to push updates to the UI without a new request for each transaction.

At step 320, the query is classified into a first domain within a plurality of domains. Query classification may be performed using one or more natural language processing (NLP) techniques, including preprocessing, tokenization, and normalization. The preprocessed text is then transformed into numerical vectors using word embedding techniques, allowing machine learning models to process and understand the linguistic patterns.

NLP frameworks such as Hugging Face's Transformer models (i.e., BERT or GPT) may be used to classify queries by outputting probabilities for each domain, with the highest probability indicating the query's domain, thus informing the next steps in query processing or response generation. Probabilities from these models may then be augmented, as shown in figures one and two, to determine the recommended domain.

At step 330, an index is retrieved of domain-specific vector embeddings that corresponds to the recommended domains. When a query is classified into a domain, the system queries the database or search engine according to the domain specific index corresponding to the identified domain. In other words, once a query is classified into a domain, the system utilizes this classification to retrieve the corresponding vector embeddings, which encapsulate the domain-specific semantic context.

Retrieval of the vector embeddings may be performed using databases or search engines such as Elasticsearch, which are capable of managing the complex data structures that vector embeddings represent. For example, using the dense vector data type, Elasticsearch is able to index and search through vector fields, allowing for efficient retrieval based on similarity scoring, such as cosine similarity or Euclidean distance measures.

At step 340, the LLM is prompted with the query and the domain-specific vector embeddings. The system then prompts the LLM with both the original query and these domain-specific embeddings.

For example, prompts may be passed to the LLM through an API call where the query and embeddings are packaged into a request and sent to the LLM, which is hosted either on the same infrastructure or accessed via a cloud-based service. The LLM processes this input, using the embeddings as a contextual anchor to inform response generation.

When an LLM generates a response, the input query is integrated with the provided context from the vector embeddings. The LLM applies generative capabilities to produce a response that aligns with the semantic space defined by the embeddings.

At step 350, a query response is received from the LLM as grounded with the most relevant index results. For example, the process may deliver the query response to the end-user or another downstream system through a combination of web technologies and communication protocols. For direct user interactions, the system may employ an API that sends the response back to the user's interface via HTTP/HTTPS protocols. The query response may be sent synchronously or asynchronous, using technologies like WebSockets for real-time applications or Server-Sent Events for unidirectional streaming.

To ensure the relevance and accuracy of the LLM's responses, a feedback loop may be implemented. In this loop, the LLM's output is evaluated against certain criteria such as relevance to the query, correctness of information, and domain appropriateness. If the response is deemed suboptimal, the feedback is used to adjust the model's parameters or to re-prompt the LLM with adjusted embeddings or additional context. The evaluation may be performed by additional machine learning models trained for quality assessment or through human-in-the-loop interventions. This iterative process may continue until the generated response meets the desired standards.

Figure 4:
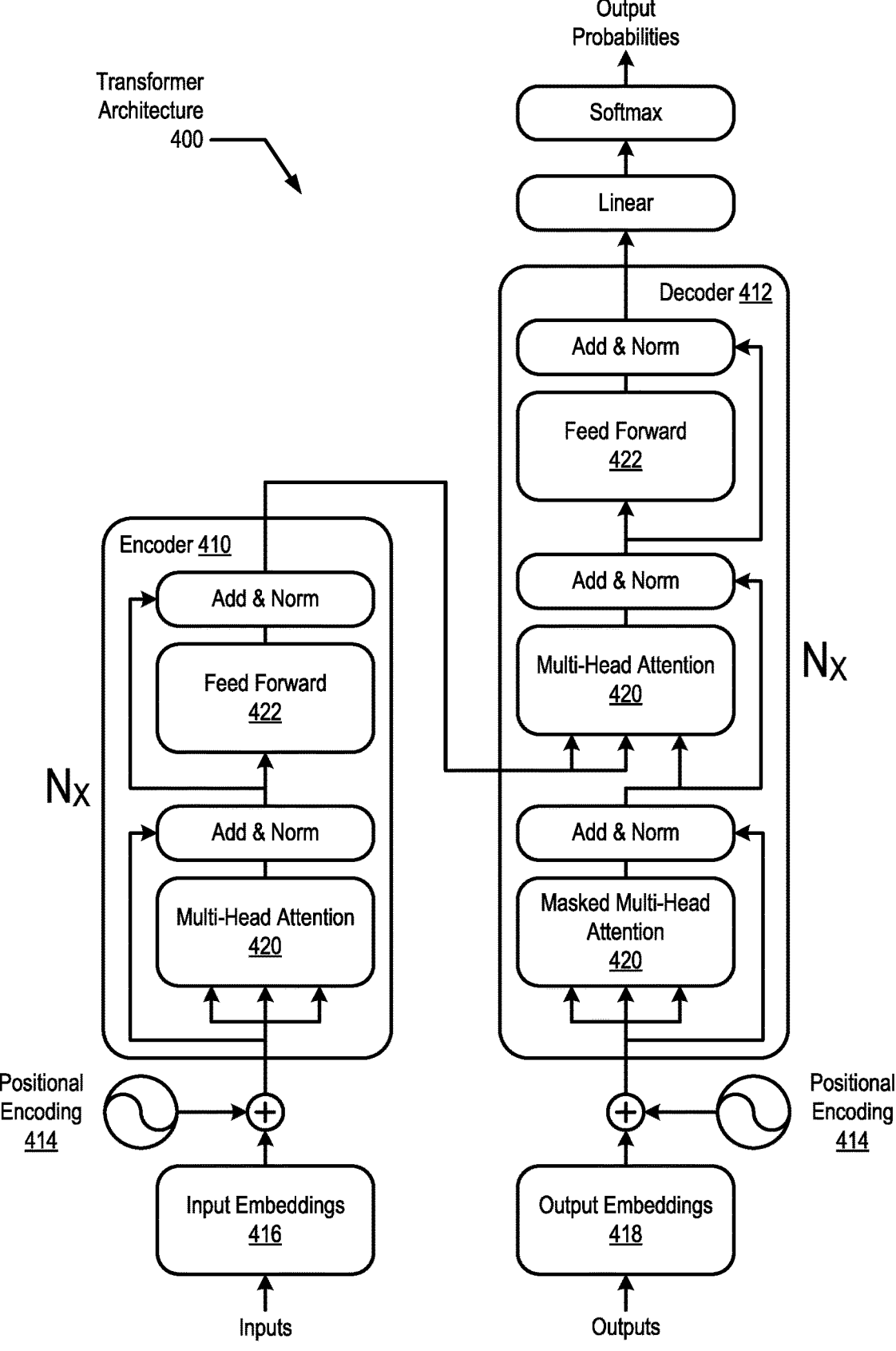
FIG. 4 shows a transformer architecture according to illustrative embodiments.

FIG. 4 shows a transformer architecture. The transformer architecture (400) may be used to implement the LLM (112) and/or the machine learning model(s) (noy shown) of FIG. 1.

The transformer architecture (400) relies on a self-attention (intra-attention) mechanism, thereby eliminating the recurrent operations computed in Recurrent Neural Networks, which may be used to compute the latent space representation of both the encoder (410) and decoder (412) sides. Positional encoding (414) is added to the input and output embeddings (416, 418) with the absence of recurrence. The positional information, which is similar to a time-step in a recurrent network, provides the transformer network with the order of input and output sequences. A combination of absolute positional encoding and relative positional information may be used. Input from the previously generated symbol is auto-regressively used by the model for the next prediction which is organized as a stack of encoder-decoder networks.

Uniform layers compose both the encoder (410) and decoder (412), with each layer being built of two sublayers: a multi-head self-attention layer (420) and a position-wise feed-forward network (FFN) layer (422). The multi-head sub-layer (420) enables the use of multiple attention functions with an equivalent cost of utilizing attention, while the FFN sub-layer (422) uses a fully connected network to process the attention sublayers. The FFN applies multiple linear transformations on each position and a Rectified Linear Unit (ReLU) which extends the self-attention mechanism to efficiently consider representations of the relative positioning (i.e., distances between sequence elements).

The following example is for explanatory purposes only and not intended to limit the scope of the invention.

Figure 5:
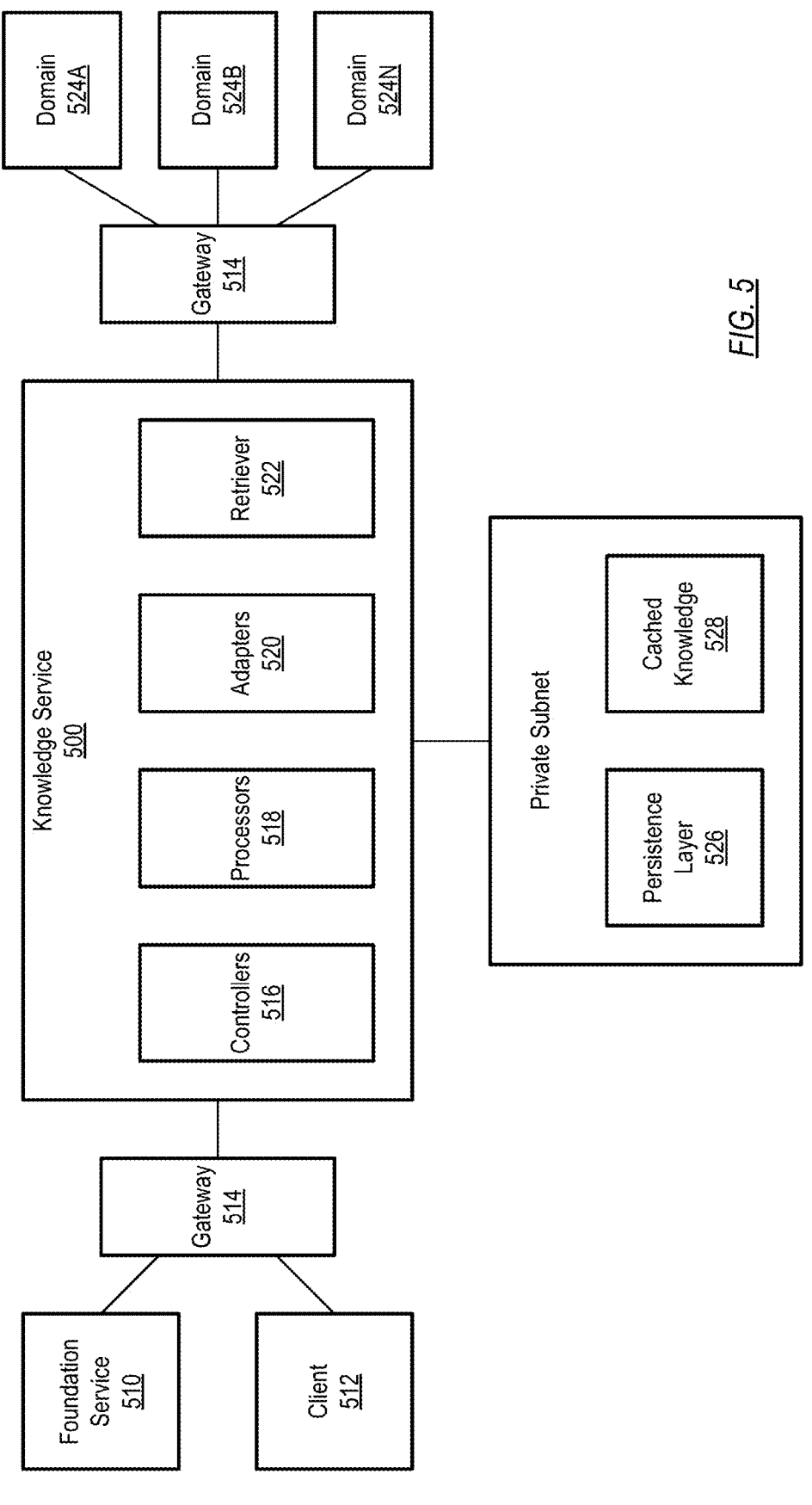
FIG. 5 shows a use case example according to illustrative embodiments.

Turning to FIG. 5, the use case is shown according to illustrative embodiments. The example shown in FIG. 5 is one example of the system and methods shown in FIGS. 1-4.

In the context of enhancing user experience and knowledge retrieval, the example of FIG. 5 provides a practical use case scenario where a comprehensive system is used to retrieve domain-specific knowledge. This user, in this example, is Jane, a software developer seeking technical information and answers to coding queries.

The foundation service (510) serves as the central hub, orchestrating communication among various components. The foundation service (510) ensures that user queries, like the ones Jane submits, are seamlessly routed to the relevant controllers, processors, and adapters. The foundation service is one example of the orchestrator (108) of FIG. 1.

Jane, the software developer, represents the client (512), the end-user of this knowledge retrieval system. She interacts with the system through a user interface, typically a web application or mobile app, where she enters queries in natural language. Jane's objective is to acquire precise, context-aware answers to her technical inquiries.

The gateway (514) acts as the intermediary between Jane and the system's foundation service. Jane's queries are received by the gateway, which then forwards them to the appropriate controllers (516) and processors (518) for handling.

In a practical user journey, Jane uses the system's user interface to enter a query concerning a coding challenge she is facing. This query is received by the gateway and directed to the appropriate controller based on the corresponding domain. In this case, Jane's inquiry is Python-specific, so the query is routed to the Python domain controller.

Within the knowledge service (500), controllers (516) are responsible for categorizing user queries and managing the initial routing. In this use case scenario, there may be multiple controllers, each dedicated to specific knowledge domains or categories. For instance, there could be controllers for programming languages, debugging techniques, or coding best practices. the controllers (516) effectively categorize Jane's queries and direct them to the processors (518) most suited to manage the specific domain of her inquiry.

Processors (518) are the domain-specific components of the system. For example, each processor may access a different index, such as index (116A, 116B, 116N) of FIG. 1. The processors receive queries from the controllers and process them within their specialized knowledge domains. Equipped with deep domain-specific embeddings and advanced algorithms, they are adept at understanding the context and providing relevant responses. For Jane, a processor specializing in Python programming, for example, would process Python-related queries.

Adapters (520) bridge the gap between processors and the retrieval layer. The Adapters (520) facilitate data transfer and translation, ensuring that processors may communicate effectively with the retrieval layer. In this example, the adapter assists the Python processor in communicating with the retriever, allowing the processors to access the knowledge database.

The retriever (522) accessing the extensive knowledge database, locating relevant information in response to user queries. In Jane's case, the retriever fetches data related to her query from a database that includes various knowledge sources, such as programming documentation, forums, and tutorials.

Domains (524A, 524 B, 524N) represent specific knowledge areas within the system, the domains may range from programming languages to debugging techniques, coding best practices, and more. The existence of multiple domains ensures that Jane may obtain context-aware answers within her field of expertise.

The persistence layer (526) is responsible for storing and organizing information for the knowledge service (500), including, for example, code snippets, documentation, and/or community discussions. The persistence layer (526) ensures that the data is easily accessible and efficiently retrieved by the retriever when Jane makes a query.

Cached knowledge (528) stores frequently accessed or recently retrieved information, allowing the system to deliver quicker responses to common queries. For example, if Jane frequently asks about a specific programming concept, the system caches relevant information to reduce response times.

The retriever scans the knowledge database for relevant information on Python multithreading, leveraging domain-specific embeddings to identify contextually relevant sources. The retriever retrieves the most pertinent information and delivers that information back to the relevant processors and controllers.

Along with the original query, the retrieved information is then used to prompt an LLM. The response is then sent back to Jane's user interface through the gateway, enabling her to instantly access a detailed explanation of multithreading in Python, complete with code examples and best practices.

The use case example demonstrates how the knowledge service (500) may provide context-aware responses to Jane's queries. Using the reasoning capabilities of the LLM augmented with specific information retrieved from the particular domains, the knowledge service significantly improves Jane's efficiency and productivity by delivering precise, grounded responses that are focused within the domain of her particular query.

Figure 6A:
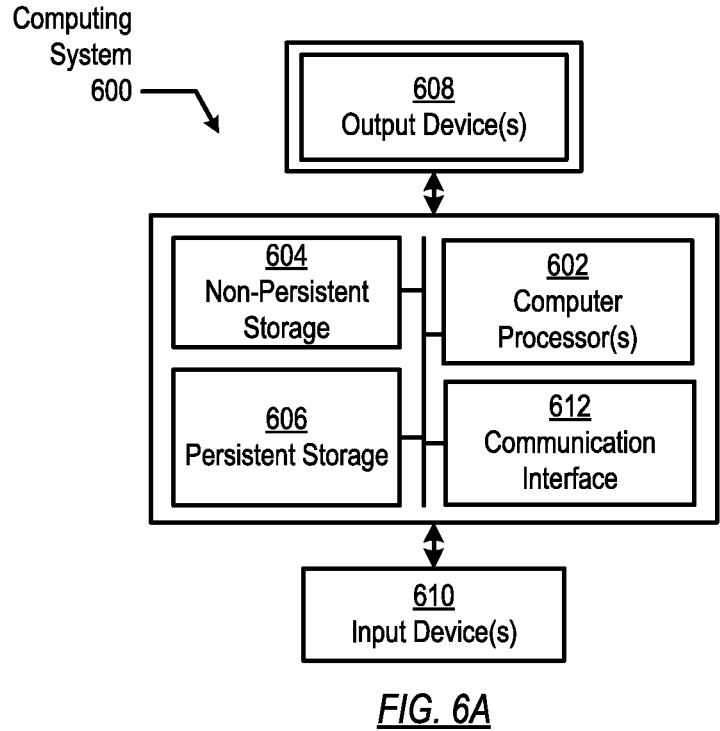
FIG. 6A and FIG. 6B shows a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processors (602), non-persistent storage (604), persistent storage (606), a communication interface (612) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) may be one or more cores or micro-cores of a processor. The computer processor(s) (602) includes one or more processors. The one or more processors may include a central processing unit (CPU), a graphics processing unit (GPU), a tensor processing units (TPU), combinations thereof, etc.

The input devices (610) may include a touchscreen, keyboard, mouse, microphone, touchpad, electronic pen, or any other type of input device. The input devices (610) may receive inputs from a user that are responsive to data and messages presented by the output devices (608). The inputs may include text input, audio input, video input, etc., which may be processed and transmitted by the computing system (600) in accordance with the disclosure. The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the output devices (608) may include a display device, a printer, external storage, or any other output device. One or more of the output devices may be the same or different from the input device(s). The input and output device(s) may be locally or remotely connected to the computer processor(s) (602). Many distinct types of computing systems exist, and the aforementioned input and output device(s) may take other forms. The output devices (608) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

Figure 6B:
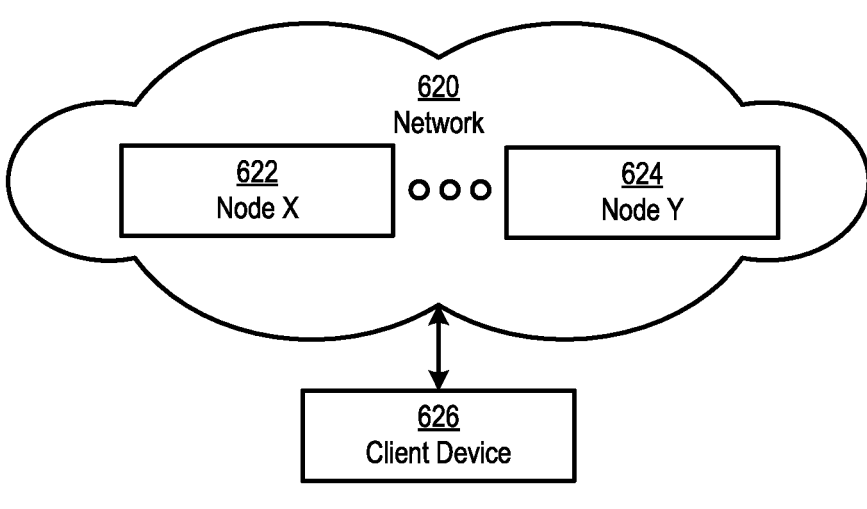

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622), node Y (624)) in the network (620) may be configured to provide services for a client device (626), including receiving requests and transmitting responses to the client device (626). For example, the nodes may be part of a cloud computing system. The client device (626) may be a computing system, such as the computing system shown in FIG. 6A. Further, the client device (626) may include and/or perform all or a portion of one or more embodiments of the invention.

The computing system of FIG. 6A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the term "or" is an "inclusive or" and, as such includes the term "and."

Further, items joined by the term "or" may include any combination of the items with any number of each item unless, expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

converting each of a plurality of datasets of a plurality of domains into a plurality of domain-specific vector embeddings;

storing the plurality of domain-specific vector embeddings in a vector store of a data repository;

classifying the plurality of datasets into the plurality of domains to obtain a classification;

storing, according to the classification, an index in an index store for each of the plurality of domain-specific vector embeddings;

receiving a query;

classifying, by a recommendation engine of an information retrieval system, the query to a domain within a plurality of domains, wherein classifying the query comprises calculating a weighted confidence score for each domain in the plurality of domains, and wherein the weighted confidence score is calculated as:

$$\text{weighted confidence}^j = \sum_{i=1}^{k}\left(\text{sigmoid}_i^j \times \text{weight}_i^j\right) + \eta_j$$

wherein:

j is a domain, k is a number of top results, i is a current index, sigmoid is a sigmoid function, weight is a confidence score weight, and ηj is a domain specific biasing constant;

retrieving, by the information retrieval system performing vector search, an index of domain-specific vector embeddings in the plurality of domain-specific vector embeddings of the domain;

transmitting, in an application programming interface (API) call, a prompt to a Large Language Model (LLM), the prompt comprising the query and the domain-specific vector embeddings;

receiving a query response from the LLM as grounded with the most relevant index results; and forwarding the query response to the user.

2. The method of claim 1, further comprising:

evaluating the query response against a criteria to determine that the query response fails the criteria;

transmitting, in a second API call, an adjusted prompt to the LLM, the adjusted prompt comprising the query and adjusted domain-specific vector embeddings of the plurality of domain specific vector embeddings;

receiving the adjusted query response from the LLM, wherein the adjusted query response is forwarded to the user.

3. The method of claim 1, wherein classifying the query further comprises:

calculating a global confidence score; and comparing the plurality of domains and suggesting the domain.

4. The method of claim 3, wherein the domain specific biasing constant is calculated as:

$$\eta_j = \omega_c \times C_j + \omega_h \times H_j + \omega_p \times P_j$$

wherein:

$\omega_c$ is a weight for the current context bias, $C_j$ is a current context relevance to domain j, $\omega_h$ is a weight for a conversation history bias, $H_j$ is a conversation history relevance to domain j, $\omega_p$ is a weight for a popularity bias, and $P_j$ is a popularity of domain j.

5. The method of claim 3, wherein comparing the plurality of domains further comprises:

if the weighted confidence is greater than the global confidence, retrieving results from the domain; and if the weighted confidence is not greater than the global confidence, retrieving results from other domains in the plurality of domains.

6. A method comprising:

converting each of a plurality of datasets of a plurality of domains into a plurality of domain-specific vector embeddings;

storing the plurality of domain-specific vector embeddings in a vector store of a data repository;

classifying the plurality of datasets into the plurality of domains to obtain a classification;

storing, according to the classification, an index in an index store for each of the plurality of domain-specific vector embeddings;

receiving a query;

classifying, by a recommendation engine of an information retrieval system, the query to a domain within a plurality of domains, wherein classifying the query comprises calculating a global confidence for each domain in the plurality of domains, and wherein the global confidence is calculated as:

$$\text{global confidence} = \mu + \beta + \sigma$$

wherein:

μ is a mean,

β is a tunable hyperparameter, and

σ is a standard deviation;

retrieving, by the information retrieval system performing vector search, an index of domain-specific vector embeddings in the plurality of domain-specific vector embeddings of the domain;

transmitting, in an application programming interface (API) call, a prompt to prompting a Large Language Model (LLM), the prompt comprising the query and the domain-specific vector embeddings;

receiving a query response from the LLM as grounded with the most relevant index results; and forwarding the query response to the user.

7. A system comprising:

a computer processor;

memory; and instructions stored in the memory and executable by the computer processor to cause the computer processor to perform operations, the operations comprising:

converting each of a plurality of datasets of a plurality of domains into a plurality of domain-specific vector embeddings;

storing the plurality of domain-specific vector embeddings in a vector store of a data repository;

classifying the plurality of datasets into the plurality of domains to obtain a classification;

storing, according to the classification, an index in an index store for each of the plurality of domain-specific vector embeddings;

receiving a query;

classifying, by a recommendation engine of an information retrieval system, the query to a domain within a plurality of domains, wherein classifying the query comprises calculating a weighted confidence score for each domain in the plurality of domains, and wherein the weighted confidence score is calculated as:

$$\text{weighted confidence}^j = \sum_{i=1}^{k}\left(\text{sigmoid}_i^j \times \text{weight}_i^j\right) + \eta_j$$

wherein:

j is a domain, k is a number of top results, i is a current index, sigmoid is a sigmoid function, weight is a confidence score weight, and $\eta j$ is a domain specific biasing constant;

retrieving, by the information retrieval system performing vector search, an index of domain-specific vector embeddings in the plurality of domain-specific vector embeddings of the domain;

transmitting, in an application programming interface (API) call, a prompt to a large language model (LLM), the prompt comprising the query and the domain-specific vector embeddings;

receiving a query response from the LLM as grounded with the most relevant index results; and forwarding the query response.

8. The system of claim 7, wherein classifying the query further comprises:

calculating a global confidence score; and comparing the plurality of domains and suggesting the domain.

9. The system of claim 8, wherein the domain specific biasing constant is calculated as:

$$\eta_j = \omega_c \times C_j + \omega_h \times H_j + \omega_p \times P_j$$

wherein:

$\omega_c$ is a weight for the current context bias, $C_j$ is a current context relevance to domain j, $\omega_h$ is a weight for a conversation history bias, $H_j$ is a conversation history relevance to domain j, $\omega_p$ is a weight for a popularity bias, and $P_j$ is the popularity of domain j.

10. The system of claim 8, wherein the global confidence is calculated as:

$$\text{global confidence} = \mu + \beta + \sigma$$

wherein:

$\mu$ is a mean, $\beta$ is a tunable hyperparameter, and $\sigma$ is a standard deviation.

11. The system of claim 8, wherein comparing the plurality of domains further comprises:

if the weighted confidence is greater than the global confidence, retrieving results from the domain; and if the weighted confidence is not greater than the global confidence, retrieving results from other domains in the plurality of domains.

\* \* \* \* \*